March 20, 1934.  F. A. HERWEHE  1,951,411
SHEARING APPARATUS
Filed Aug. 9, 1930   3 Sheets-Sheet 3
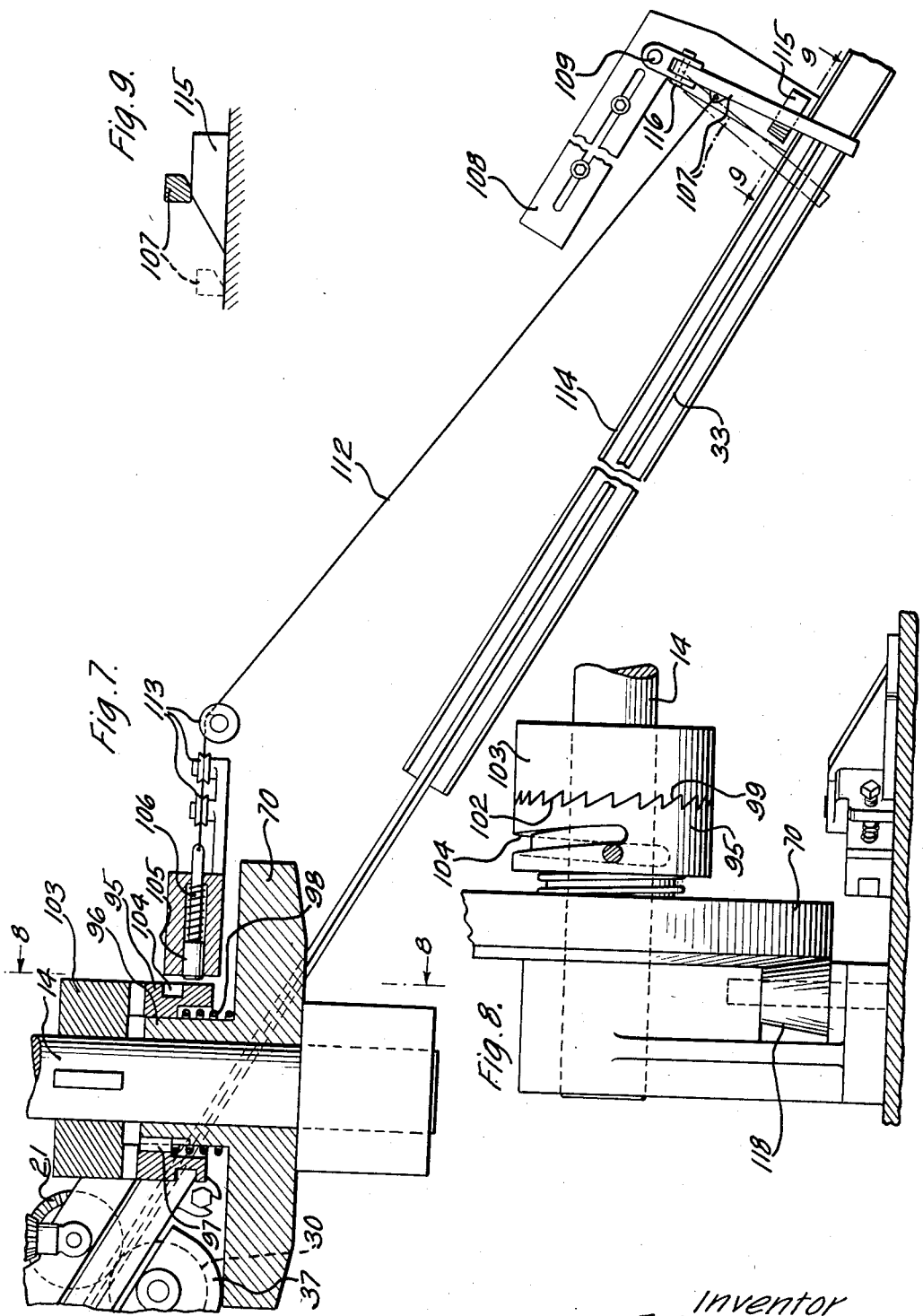
Inventor
F. A. Herwehe
By H. B. Whitfield Att'y.

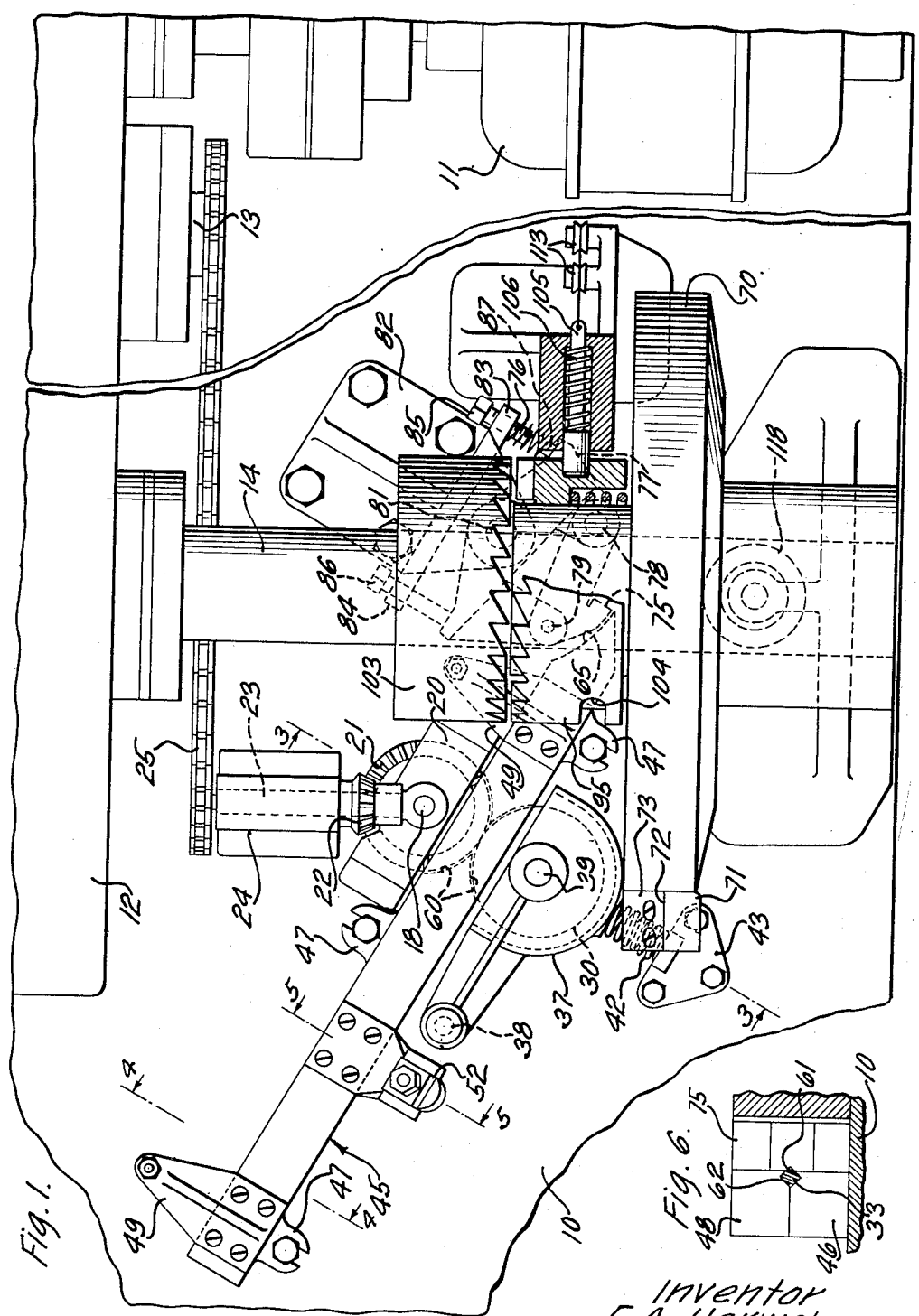

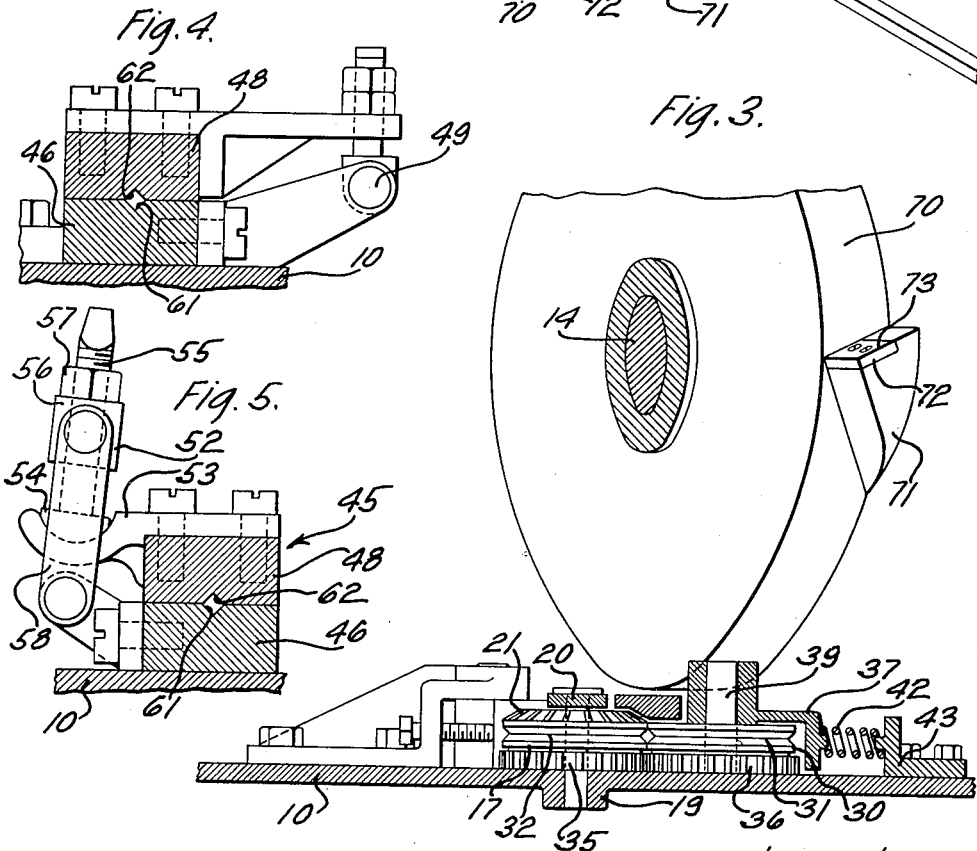

Patented Mar. 20, 1934

1,951,411

UNITED STATES PATENT OFFICE 1,951,411

SHEARING APPARATUS

Frederick A. Herwehe, Chicago, Ill., assignor to Western Electric Company, Incorporated, New York, N. Y., a corporation of New York Application August 9, 1930, Serial No. 474,130

11 Claims. (Cl. 164—68)

This invention relates to a shearing apparatus, and more particularly to an apparatus for shearing strip or bar stock into predetermined lengths.

An object of the invention is to provide an efficient and expeditious apparatus for shearing material.

In one embodiment of the invention an apparatus is provided for shearing strip or bar stock into predetermined lengths as it is received from the rolling mill without interrupting the feed wherein the rod is moved past a rotating disk or wheel having its axis at an angle to the movement of the rod and carrying a knife at one point in the periphery which moves at the same speed as the stock so that the knife moves with the stock while it is severing it against a pivoted member which also is carried with the stock during the severing operation, but is released to return to normal position when the severing is completed. The disk crosses the material at such an angle and velocity that the component of the knife velocity parallel to the material is equal to the velocity of the material, while the other component is perpendicular thereto.

Other objects of the invention will be apparent from the following description, taken in connection with the accompanying drawings, wherein Fig. 1 is a top plan view of the apparatus;

Fig. 2 is an enlarged fragmentary sectional view of a portion of the apparatus showing the shearing of the rod;

Fig. 3 is a sectional view taken substantially along the line 3—3 of Fig. 1;

Fig. 4 is an enlarged sectional view taken along the line 4—4 of Fig. 1;

Fig. 5 is an enlarged sectional view taken along the line 5—5 of Fig. 1;

Fig. 6 is a sectional view taken along the line 6—6 of Fig. 2;

Fig. 7 is a fragmentary sectional view of the shearing wheel engaging and disengaging mechanism;

Fig. 8 is a sectional view taken along the line 8—8 of Fig. 7, and

Fig. 9 is a sectional view taken along the line 9—9 of Fig. 7.

Referring now to the drawings wherein like reference numerals designate the same parts throughout the several views, reference numeral 10 indicates a base or support upon which is mounted a motor 11 operatively connected to a speed reducer 12, which has an intermediate shaft 13 and a low speed shaft 14. A guiding and advancing mechanism is operatively connected to the intermediate shaft 13 and consists of a drive roller 17 mounted upon a shaft 18, one end of which is journaled in the base 10 at 19 while the other end is journaled in a stationary bracket 20 extending over the roller and fixed to the base 10. A beveled gear 21 is integral with the roller 17 and meshes with a pinion 22 mounted upon one end of a shaft 23 which is journaled in a bearing bracket 24, the other end of the shaft 23 being operatively connected to the intermediate shaft 13 by a sprocket and chain connection 25.

Disposed adjacent the roller 17 is a companion roller 30 having a groove 31 in the periphery thereof, which is V-shaped in cross section and which cooperates with a similar V-shaped groove 32 in the periphery of the roller 17 for forming an aperture of any desired contour, such as square, for conforming to and receiving the stock 33 (Fig. 2). A gear 35, arranged to rotate with the roller 17, is in mesh with a gear 36 so as to impart a rotative movement to the roller 30 equal in speed but opposite in direction to that of the roller 17. A movable housing 37 for the roller 30 is pivotally mounted at 38 upon the support 10 and has a shaft 39 for the roller 30 and the gear 36 which are normally held in close proximity to the roller 17 and the gear 35, respectively, by a spring 42 which abuts the housing 37 at one end, the other end engaging a bracket 43 mounted upon a support 10.

A transversely extending guide unit is indicated generally at 45 and consists of a lower or stationary member 46 having slotted lugs 47 by means of which it is secured, by the aid of screws, to the support 10 (Fig. 1). An upper or cover member 48 is connected to the lower member 46 and allowed to be moved toward or away therefrom by hinge members 49 disposed at the outer ends thereof.

Positioned between the hinge members 49 is an adjustable locking latch 52 (Figs. 1 and 5) consisting of a socket 53 mounted upon and extending outwardly from the cover member 48, so as to receive a dome shaped head portion 54 of a threaded latch 55. The threaded latch 55 extends through a collar 56 and has a lock nut 57 disposed thereupon, the collar being movably connected to the lower or stationary member 46 by pivotal links 58. The members 46 and 48 have concave recesses 60—60 for receiving the rollers 17 and 30 and the gears 35 and 36 and longitudinally extending grooves 61 and 62 are disposed in the members 46 and 48, respectively, thus forming an aperture between the closed members 46 and 48 which is square in cross-sectional contour and communicates with the square aperture at the engagement of the rollers 17 and 30 so as to guide the bar 33 in the grooves 31 and 32 between the rollers 17 and 30. The longitudinally extending grooves 61 and 62 also extend beyond the rollers and to the ends of the members 46 and 48 which have arcuate shaped cutaway portions 65 terminating adjacent the center of the grooves, the opposite sides thereof being cut transversely relative to the grooves 61 and 62 at right angles to the center line of the shaft 14.

By viewing Fig. 1 it will be observed that the guide unit 45 extends transversely relative to the shaft 14 to a position near the path of a cutting wheel 70, which is mounted upon the shaft 14 and positioned so that the lower periphery thereof will move in a general direction with the rod 33 and will cross the path of the rod at a position adjacent the end of the guide unit 45. A projection 71 (Fig. 3) is integral with the periphery of the wheel 70 having a cutaway portion 72 to receive a shearing blade 73 which extends at right angles relative to the path of the bar 33 when positioned adjacent the inner end of the guide unit 45.

Normally positioned adjacent the inner end of the guiding unit 45 is an abutting member 75 which is in close proximity to the bar 33 during its movement through the guide unit and is held in this position by a spring 76 forcing against one end of a yoke 77 which carries the abutting member 75. The connection between the abutting member 75 and the yoke 77 consists of a relatively large pin 78 and a relatively small shearing pin 79, the pin 78 allowing a pivotal movement of the abutting member 75, should the pin 79 be sheared on account of undue pressure being applied thereto. To allow an arcuate movement of the abutting member 75, the yoke 77 is pivotally mounted at 81 upon a bracket 82 which is mounted upon the support 10 and provided with outwardly extending lugs 83 and 84 for receiving adjustable stop members or screws 85 and 86, respectively. The spring 76 is disposed concentric with the stop screw 85 and a lug 87, the latter being integral with the yoke 77 and arranged to engage with the stop screw 85 to limit the movement of the abutting member 75 with the bar 33. The purpose of the stop screw 86 is to vary the normal position of the abutting member 75 relative to the inner end of the shearing blade 73.

In order that portions of various lengths may be sheared from the bar 33, means is provided for connecting and disconnecting the wheel 70 with the shaft 14 during the continuous movement of the bar. This means consists of a toothed sleeve 95 disposed concentric with a hub 96 of the wheel 70 and movably keyed thereto as at 97. The sleeve 95 is normally held outwardly by a spring 98 so that teeth 99 of the sleeve will engage teeth 102 of a collar 103 which is fixed to the shaft 14 and rotatable therewith. A cam groove 104 is disposed in the periphery of the sleeve 95 and arranged to receive a plunger 105 normally forced inwardly toward the sleeve 96 by a spring 106 and arranged to be moved outwardly by the actuation of a lever 107, which is pivotally secured to an adjustable support 108, at 109, and operatively connected to the plunger 105 by a cable 112 or the like, which passes over sheaves 113—113. The lever 107 is positioned above a chute 114 in alignment with the bar 33 passing therethrough and arranged to be moved into engagement with a cam 115 for a purpose hereinafter described.

From the foregoing description of the various parts of the device, the operation thereof will be more clearly understood. Let it be assumed that the motor 11 is energized, thus actuating the speed reducer mechanism 12 so as to rotate the shafts 13 and 14. The rotation of the shaft 13 actuates the rollers 17 and 30 to move the bar 33 through the guide unit 45 and to advance the bar at a predetermined continuous motion past the wheel 70. The wheel 70 is of such a size and is rotated at a speed so that a predetermined length of bar, such as five feet, will move beyond the inner end of the guide member 45 at each revolution of the wheel 70. Therefore, the bar will be cut into equal lengths during a continuous movement of the bar and the continuous rotation of the wheel 70.

The shearing of the bar 33 (Fig. 2) takes effect as the shearing blade 73 engages with the bar at right angles relative thereto and at a position slightly advanced from the abutting member 75. As the bar 33 continues to move, the shearing plate 73 is moved at such a speed that its component of motion in the direction of movement of the bar is equal to that of the bar, but due to the transverse movement of the shearing blade relative to the bar 33, the shearing blade is moved through the bar. In order to effect a perfect shearing of the bar, the shearing plate 73 causes a frictional engagement of the bar 33 with the abutting member 75, thus moving the abutting member in an arcuate path and positioning the shearing edge of the abutting member in close proximity to the shearing blade 73 slightly to the rear thereof as the shearing blade is forced through the bar. The shearing of the bar 33 takes place during the movement of the abutting member 75 from the dotted line position to the solid line position (Fig. 2), thus holding the bar against bending as the shearing blade is forced therethrough, the shearing blade continuing in its circuitous path while the sheared portion of the bar 33 continues in its movement through the chute 114 (Fig. 7).

During this operation, the strip or bar stock is fed into the guide unit 45 from the rolling mill (not shown) and by the aid of the rollers 17 and 30 the bar is moved so that the shearing blade 73 moves with the bar while it is shearing the bar, the wheel and shearing blade crossing the material at such an angle and velocity that the component of the shearing blade velocity parallel to the material is equal to the velocity of the material, while the other component is perpendicular thereto.

If the operation is stopped while the bar is in the guide unit 45, and it is desirous of removing the bar therefrom, or if a new bar is to be placed in the grooves 61 and 62 of the guide unit, the cover member 48 may be swung away from the stationary member 46 by releasing the locking latch 52, this being accomplished by throwing the latch beyond dead center, and swinging it outwardly by the links 58, thus freeing the movable portion 48. After the new bar has been inserted in place, the movable lever 48 can be swung into engagement with the stationary member 46 and locked in place by forcing the head portion 54 into close engagement with the socket 53 due to the rotation of the member 55 and locking the member 55 against rotation by the lock nut 57.

If it is desired to cut the bar 33 into greater lengths, the lever 107, which may be moved out of the path of the bar 33 about the pivot 116, it is positioned as shown in Fig. 7 so that the bar 33 will strike the lever, move the lever about its pivot 109 a distance sufficient to move the cable 112 and remove the plunger 105 from the cam groove 104 in the sleeve 95, thus freeing the sleeve and allowing the spring 98 to move it into operative engagement with the collar 103. In this manner the wheel 70 is operatively connected to the shaft 14 and rotated therewith after a predetermined pause in rotation. This pause in the rotation of the wheel 70 is effected by the plunger 105 which is released shortly after it is removed from the cam groove 104 due to the lever 107 moving upon the cam 115 and moving out of the path of the bar 33, allowing the plunger to ride upon the periphery of the sleeve 95 until the cam groove 104 is again moved into receiving position, the plunger 105 then being forced into the cam groove 104 by the spring 106, and by further movement of the wheel 70 with the sleeve 95, the sleeve is moved out of operative engagement with the collar 103.

The wheel 70 remains at rest until the newly sheared end of the bar 33 engages the lever 107 and again removes the plunger, allowing the operative engagement to be effected between the wheel 70 and the shaft 14, and during this operative engagement a portion of predetermined length is sheared from the bar 33. This portion may be varied in length as desired by varying the position of the adjustable support 108 relative to the point of shearing, and by so doing the time at which the wheel 70 remains at rest is varied so as to allow the desired amount of stock to pass beyond the shearing position before the shearing blade 73 is moved across the path of the bar. In order to relieve the wheel 70 of the lateral thrust during the shearing of the bar, a thrust roller 118 is rotatably disposed in engagement with the wheel 70 (Fig. 8).

Even though this form of the invention shows the rotating wheel or disk having a single shearing blade mounted upon its periphery and disposed at a predetermined angle relative to the path of the moving stock, it is obvious that a plurality of shearing blades may be disposed upon the periphery of the disk or wheel without departing from the spirit or scope of the invention. It is also apparent that the carrier would not necessarily have to be a wheel or disc.

What is claimed is:

1. In a shearing apparatus, a guide unit for guiding stock in one direction to be sheared, an abutting member disposed adjacent the stock passing from said guide unit, a shearing member for engaging the stock adjacent said abutting member for moving with and through the stock, the engagement of said shearing member with the stock causing a frictional engagement of the abutting member with the stock for moving the abutting member with the stock during the movement of said shearing member therethrough.

2. In a shearing apparatus, a guide unit for guiding stock to be sheared in one direction, an abutting member disposed adjacent the stock passing from said guide unit, a shearing member for engaging the stock adjacent said abutting member for moving with and through the stock, the engagement of said shearing member with the stock causing a frictional engagement of the abutting member with the stock for moving the abutting member with the stock during the movement of said shearing member therethrough, and means for moving the abutting member to normal position after the movement of said shearing member through the stock.

3. In an apparatus for shearing metallic bar stock or the like, means for imparting movement to the stock, a rotary wheel disposed in a plane transverse to the path of the moving stock, a shearing member mounted upon the periphery of said wheel and arranged to move across the path of the stock during the rotation of said wheel for shearing the stock into predetermined lengths, means for guiding the stock to said shearing means, and an abutting member disposed adjacent the end of said guiding means for engaging the stock during the engagement of said shearing means therewith for holding the stock against displacement during the shearing thereof.

4. In an apparatus for shearing metallic bar stock or the like, means for imparting movement to the stock, a rotary wheel disposed in a plane transverse to the path of the moving stock, a shearing member mounted upon the periphery of said wheel and arranged to move across the path of the stock during the rotation of said wheel for shearing the stock into predetermined lengths, means for guiding the stock to said shearing means, an abutting member disposed adjacent the end of said guiding means for engaging the stock during the engagement of said shearing means therewith for holding the stock against displacement during the shearing thereof, said abutting member being pivotally mounted and arranged to move with said shearing means, and means for returning said abutting member to its normal position after the completion of the shearing operation.

5. In a shearing apparatus, means for feeding stock thereto, a shearing member, and a rotary disk carrying an inclined cutter upon its peripheral surface across the path of the stock and at an angle thereto the cutting edge of which lies in a radial line which is also in substantial parallelism with the surface of the disk and cooperating with said shearing member.

6. In a shearing apparatus, means for advancing material longitudinally, a cutting element, and means for moving the edge of said cutting element in a plane at an acute angle with respect to the material the component of its motion parallel to the material being equal to the velocity of the material so that it will cut the material at right angles to the longitudinal axis.

7. In a shearing apparatus, means for advancing material longitudinally, a cutting element, means for moving the edge of said cutting element in a plane at an acute angle with respect to the material the component of its motion parallel to the material being equal to the velocity of the material so that it will cut the material at right angles to the longitudinal axis, and an abutting member positioned adjacent the material and movable therewith during the cutting thereof.

8. In a shearing apparatus, means for advancing material longitudinally, a cutting element, means for moving said cutting element in a plane at an acute angle with respect to material the component of its motion parallel to the material being equal to the velocity of the material so that it will cut the material at right angles to its longitudinal axis, an abutting member positioned adjacent the material and movable therewith during the cutting thereof, and means for returning said abutting member to its normal position.

9. In a shearing apparatus, means for advancing material longitudinally, a cutting element, means for moving said cutting element in a plane at an acute angle with respect to the material the component of its motion parallel to the material being equal to the velocity of the material so that it will cut the material at right angles to its longitudinal axis, and means for effecting intermittent movement of said cutter moving means.

10. In a shearing apparatus, means for advancing material longitudinally, a cutting element, means for moving said cutting element in a plane at an acute angle with respect to the material the component of its motion parallel to the material being equal to the velocity of the material so that it will cut the material at right angles to its longitudinal axis, means for effecting intermittent movement of said cutter moving means, including a chute for receiving the material during its advancement, means positioned in the path of the material while in said chute and arranged to be moved by the material while advancing, and means actuated by the movement of said member for effecting a rotation of said abutting element.

11. In a shearing apparatus, means for advancing material longitudinally, a cutting element, means for moving said cutting element to the material, through the material and beyond the material all in a plane at an acute angle to the direction of movement of the material, the difference between the rate of movement of the cutter and the rate of movement of the material being predetermined in order to determine the angle at which the material is cut.

FREDERICK A. HERWEHE.